(12) United States Patent
Hao et al.

(10) Patent No.: US 12,486,091 B2
(45) Date of Patent: Dec. 2, 2025

(54) PACKAGING ARTICLE WITH SURFACE COATING

(71) Applicant: Colgate-Palmolive Company, New York, NY (US)

(72) Inventors: Zhigang Hao, Bridgewater, NJ (US); Long Pan, Somerset, NJ (US); Shiyou Xu, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 104 days.

(21) Appl. No.: 18/066,509

(22) Filed: Dec. 15, 2022

(65) Prior Publication Data

US 2024/0199295 A1 Jun. 20, 2024

(51) Int. Cl.
| | |
|---|---|
| *B65D 65/42* | (2006.01) |
| *B65D 35/14* | (2006.01) |
| *C09D 5/00* | (2006.01) |
| *C09D 7/45* | (2018.01) |
| *C09D 7/48* | (2018.01) |
| *C09D 7/63* | (2018.01) |
| *C09D 191/00* | (2006.01) |
| *B65D 35/44* | (2006.01) |
| *C08K 5/20* | (2006.01) |

(52) U.S. Cl.
CPC ............. *B65D 65/42* (2013.01); *B65D 35/14* (2013.01); *C09D 5/00* (2013.01); *C09D 7/45* (2018.01); *C09D 7/48* (2018.01); *C09D 7/63* (2018.01); *C09D 191/00* (2013.01); *B65D 35/44* (2013.01); *C08K 5/20* (2013.01)

(58) Field of Classification Search
CPC ........ B65D 65/42; B65D 35/14; B65D 35/44; B65D 2231/027; B65D 35/00; B65D 25/14; C09D 5/00; C09D 7/45; C09D 7/48; C09D 7/63; C09D 191/00; C08K 5/20
See application file for complete search history.

(56) References Cited

U.S. PATENT DOCUMENTS

| | | | |
|---|---|---|---|
| 3,306,500 A | * | 2/1967 | Williams ............... B65D 35/24 222/386.5 |
| 10,421,866 B2 | | 9/2019 | Renner et al. |
| 10,428,222 B2 | | 10/2019 | Renner et al. |
| 2014/0314975 A1 | | 10/2014 | Smith et al. |

(Continued)

FOREIGN PATENT DOCUMENTS

| | | |
|---|---|---|
| EP | 3087124 | 11/2016 |
| EP | 3287387 | 2/2018 |

(Continued)

OTHER PUBLICATIONS

International Search Report and the Written Opinion of the International Searching Authority issued in International Application PCT/US2023/083327 mailed Apr. 8, 2024.

*Primary Examiner* — Donnell A Long (57) ABSTRACT

A coated packaging article may include a packaging article and a coating. The packaging article may include a body having an interior surface, and the coating may be disposed over at least one portion of the interior surface of the body. The coating may include an edible oil and a surfactant. The coating may be in a liquid state on the interior surface inside the packaging article. The coating may be in direct contact with the at least one portion of the interior surface of the body.

19 Claims, 6 Drawing Sheets

(56) References Cited

U.S. PATENT DOCUMENTS

| | | | |
|---|---|---|---|
| 2014/0314991 A1 | 10/2014 | Smith et al. | |
| 2015/0076030 A1 | 3/2015 | Smith | |
| 2015/0144522 A1 | 5/2015 | Hibben et al. | |
| 2015/0273518 A1 | 10/2015 | Varanasi et al. | |
| 2016/0333187 A1 | 11/2016 | Bauer et al. | |
| 2017/0021385 A1 | 1/2017 | Smith et al. | |
| 2017/0130155 A1* | 5/2017 | Okada .................... | B65D 23/02 |
| 2017/0135378 A1 | 5/2017 | Tse et al. | |
| 2017/0361983 A1* | 12/2017 | Beltman ................ | B65D 25/14 |
| 2018/0162595 A1 | 6/2018 | Komatsu et al. | |
| 2019/0039796 A1 | 2/2019 | Farnham et al. | |
| 2019/0351601 A1 | 11/2019 | Varanasi et al. | |
| 2020/0255198 A1 | 8/2020 | Farnham et al. | |
| 2021/0030632 A1 | 2/2021 | Wei et al. | |
| 2021/0269652 A1 | 9/2021 | Renner et al. | |
| 2022/0264911 A1 | 8/2022 | Yu et al. | |
| 2022/0282177 A1 | 9/2022 | Heise et al. | |

FOREIGN PATENT DOCUMENTS

| | | | |
|---|---|---|---|
| EP | 3552990 | 10/2019 | |
| EP | 3666675 | 6/2020 | |
| WO | 2014/145414 | 9/2014 | |
| WO | 2014/145586 | 9/2014 | |
| WO | 2015/039085 | 3/2015 | |
| WO | 2015/077765 | 5/2015 | |
| WO | 2015/148661 | 10/2015 | |
| WO | 2016/138261 | 9/2016 | |
| WO | 2016/183574 | 11/2016 | |
| WO | 2020/214684 | 10/2020 | |
| WO | 2022/136591 | 6/2022 | |
| WO | WO-2023086919 A1 * | 5/2023 | ........... C09D 191/06 |

\* cited by examiner

PACKAGING ARTICLE WITH SURFACE COATING

BACKGROUND

Oral, personal, and/or home care products, including oral, personal, and/or home cleaning products, may contain one or more surfactants, polymers, and/or oxidative chemical reagents. Some of the ingredients may have strong physical and/or chemical interactions with packaging materials. For example, some oral care products, such as toothpaste, may be generally hydrophilic and may include a mixture of water, glycerol, and sorbitol ingredients with backbone polymer(s) and surfactant(s). The ingredients of the product may adsorb and/or absorb to the surface of the packaging, causing product waste since not all of the product content can come out of the packaging. In some instances, the ingredients of the product may even penetrate through the interior surface of the packaging and further interact with packaging material. These interactions pose great challenges to develop new sustainable packaging items as the interactions between the ingredients of the product and the packaging material may alter the composition of the product. Such interactions may further result in packaging function loss, such as packaging shape deformation and/or product leaking, both of which could affect product stability. Thus, there is a need for reducing and/or preventing the interaction between the packaging materials and the product contained in the packaging.

Additionally, oxygen residues exist in almost all products due to its presence in water and other ingredients for formulating the products. Thus, there is a need for protecting the product from oxidation due to residual oxygen introduced during manufacturing.

BRIEF SUMMARY

According to some embodiments, a coated packaging article for an oral, personal, or home care composition may include a packaging article comprising a body having an interior surface, and a coating disposed over at least one portion of the interior surface of the body. In some embodiments, the coating may include an edible oil and a surfactant. In some embodiments, the coating may be in a liquid state on the interior surface inside the packaging article.

According to some embodiments, a packaged substance may include a substance, and a coated packaging article. In some embodiments, the coated packaging article may include a packaging article comprising a body having an interior surface, and a coating disposed over at least one portion of the interior surface of the body. In some embodiments, the coating may include an edible oil and a surfactant. In some embodiments, the coating may be in a liquid state on the interior surface inside the packaging article. In some embodiments, the substance may be received in the packaging article. In some embodiments, the coating may be disposed between the interior surface of the body of the packaging article and the substance. In some embodiments, the substance may include at least one of an oral care composition, a personal care composition, or a home care composition. In some embodiments, the substance may include a toothpaste.

According to some embodiments, a method of dispensing a substance in a coated packaging article may include dispensing a portion of the substance out of the coated packaging article. In some embodiments, the coated packaging article may include a packaging article comprising a body having an interior surface, and a coating disposed over at least one portion of the interior surface of the body. In some embodiments, the coating may include an edible oil and a surfactant. In some embodiments, the coating may be in a liquid state on the interior surface inside the packaging article. In some embodiments, the coating may be disposed between the interior surface of the body of the packaging article and the substance. In some embodiments, a portion of the coating may be dispersed out of the packaging article along with the substance.

According to some embodiments, a coating composition may include an edible oil, and a surfactant. In some embodiments, the coating composition may be configured to maintain a liquid state after being applied onto a surface.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom"

as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range. Thus, a range from 1-5, includes specifically 1, 2, 3, 4 and 5, as well as sub ranges such as 2-5, 3-5, 2-3, 2-4, 1-4, etc.

The term "about" when referring to a number means any number within a range of 5% of the number. For example, the phrase "about 2.0 wt. %" refers to a number between and including 1.900 wt. % and 2.100 wt. %.

All references cited herein are hereby incorporated by reference in their entireties. In the event of a conflict in a definition in the present disclosure and that of a cited reference, the present disclosure controls.

The abbreviations and symbols as used herein, unless indicated otherwise, take their ordinary meaning. The abbreviation "wt. %" means percent by weight. The symbol "°" refers to a degree, such as a temperature degree or a degree of an angle. The symbols "h", "min", "mL", "nm", "µm" means hour, minute, milliliter, nanometer, and micrometer, respectively.

Any member in a list of species that are used to exemplify or define a genus, may be mutually different from, or overlapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

Figure 1:
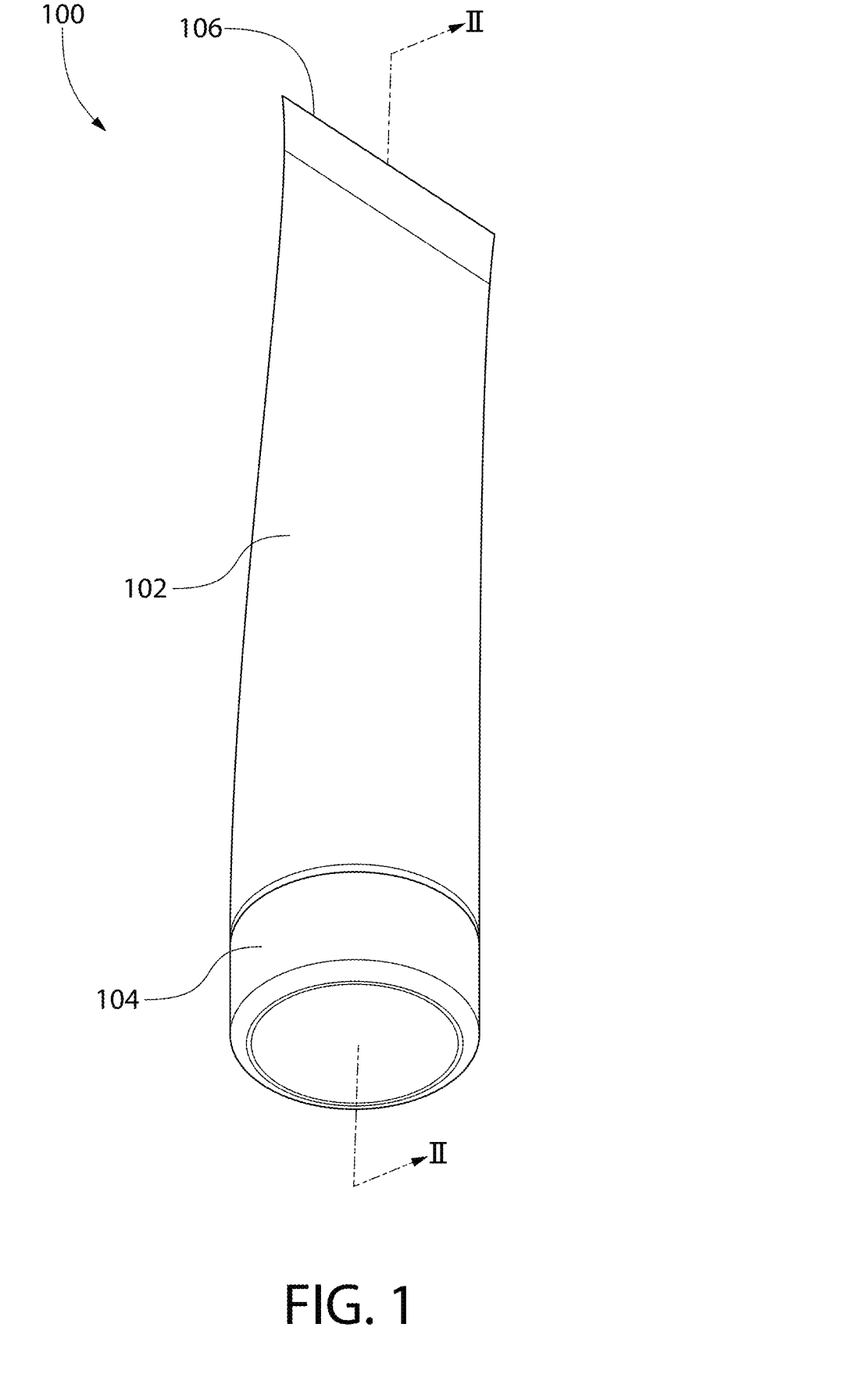
FIG. 1 schematically illustrates a packaging article according to some embodiments.

FIG. 1 schematically illustrates a packaging article 100 according to some embodiments. The packaging article 100 may include a body 102 and a closure component 104 detachably coupled to the body 102. The packaging article 100 may be configured for receiving in the body 102 a substance and for dispensing the substance when the closure component 104 is detached from the body 102. Although a tube assembly is shown in FIG. 1, the packaging article 100 or the body 102 may take any suitable form, such as a bottle, a box, a can, a pouch, a bag, etc., so long as it can be configured for receiving or storing therein a substance and for subsequently dispensing the substance.

The body 102 may include a first end 106 and a second end (not shown; concealed by the closure component 104) opposite the first end 106. The first end 106 of the body 102 may be scaled and the second end of the body 102 may be open for dispensing the substance when the closure component 104 is detached from the body 102. Thus, the first end 106 and the second end may also be referred to as the sealed end and the dispensing end, respectively. In some embodiments, to dispense the substance, a squeezing action on the body 102 may be applied. For example, a user may apply a squeezing force onto the body 102 to cause the body 102 to compress, resulting in the dispensing of the substance out of the body 102 from the dispensing end. In some embodiments, an actuation mechanism, such as a pump or the like, may be employed for dispensing the substance without squeezing or compressing the body.

Figure 2:
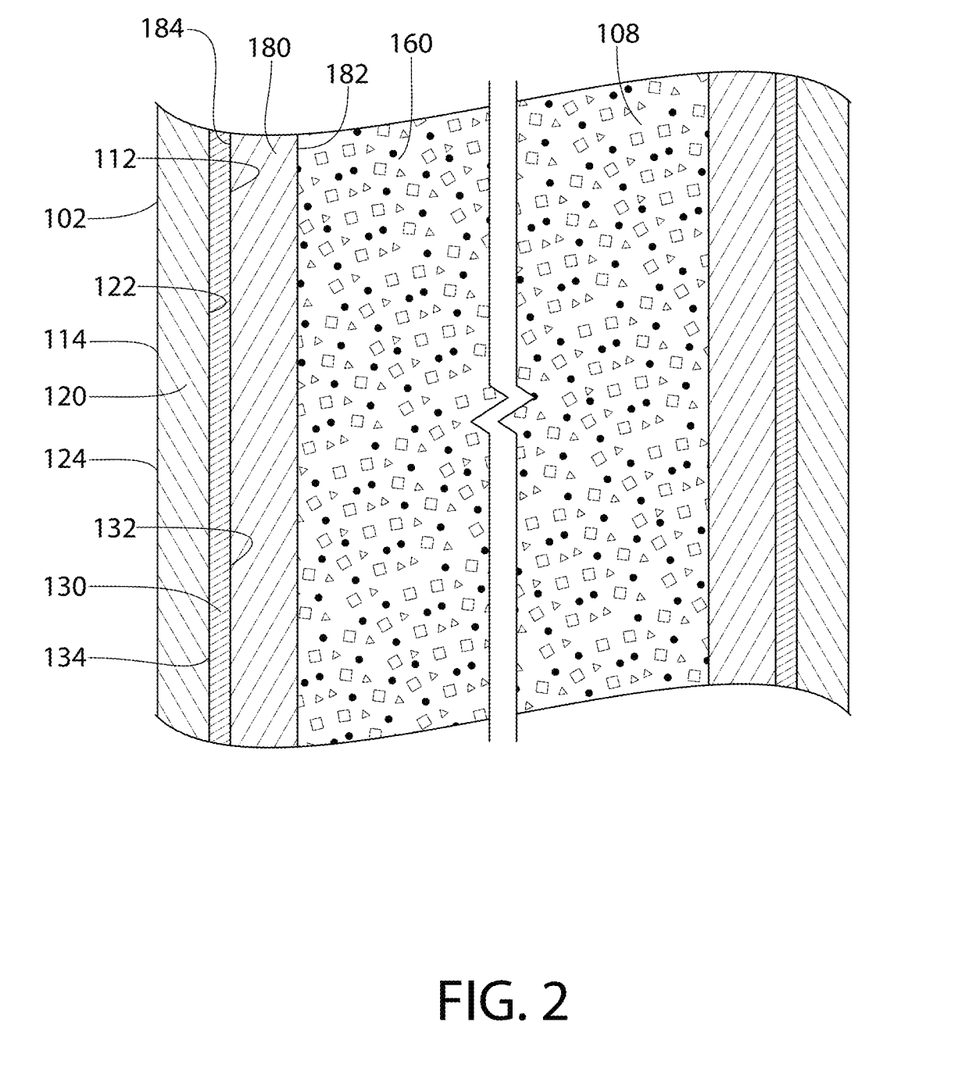
FIG. 2 schematically illustrates a cross-sectional view of a portion of the packaging article of FIG. 1, taken along line II-II of FIG. 1.

FIG. 2 schematically illustrates a cross-sectional view of a portion of the packaging article 100, in particular, a portion of the body 102 of the packaging article 100, of FIG. 1, taken along line II-II of FIG. 1. FIG. 2 further schematically illustrates a substance 160 contained in an interior cavity 108 of the packaging article 100. In some embodiments, the body 102 may include an interior surface 112 defining at least in part the interior cavity 108 and an exterior surface 114 opposite the interior surface 112.

In some embodiments, the body 102 may include a fibrous layer 120 or a fibrous tube. The fibrous layer 120 may include an interior surface 122 facing the interior cavity 108 and an exterior surface 124 opposite the interior surface 122. In some embodiments, the fibrous layer 120 may form the outer most layer of the body 102, and thus, the exterior surface 124 of the fibrous layer 120 may also form or define the exterior surface 114 of the body 102. In some embodiments, the fibrous layer 120 may form the inner most layer of the body 102, and thus, the interior surface 122 of the fibrous layer 120 may also form or define the interior surface 112 of the body 102 and may define at least in part the interior cavity 108 of the packaging article 100.

In some embodiments, the fibrous layer 120 may be formed from a fibrous material. Exemplary fibrous materials may include cellulosic materials such as paper, paperboard, cardboard, and the like. Although only a single layer is shown in FIG. 2, the fibrous layer 120 may include one or more layers of any of the fibrous materials noted above. In some embodiments where the fibrous layer 120 may form the outer most layer of the body 102, the exterior surface 114 of the body 102 may be defined or formed at least in part by the fibrous material. In some embodiments where the fibrous layer 120 may form the inner most layer of the body 102, the interior surface 112 of the body 102 may be defined or formed at least in part by the fibrous material.

In some embodiments, the body 102 may further include a lining 130 disposed over at least a portion or an entirety of the fibrous layer 120. The lining 130 may include an interior surface 132 facing the interior cavity 108 of the packaging article 100. The lining 130 may further include an exterior surface 134 opposite the interior surface 132 and facing the interior surface 122 of the fibrous layer 120. In some embodiments, the lining 130 may form the inner most layer of the body 102, and thus, the interior surface 132 of the fibrous layer 120 may also form or define the interior surface 112 of the body 102 and may define at least in part the interior cavity 108 of the packaging article 100.

In some embodiments, the lining 130 may include a recyclable material. In some embodiments, the lining 130 may include a plastic material, such as polyethylene (PE) (e.g., high-density polyethylene (HDPE), low-density polyethylene (LDPE), etc.), polyethylene terephthalate (PET), and the like. In some embodiments, the lining 130 may include a fibrous material, such as paperboard, cardboard, fiberboard, and the like. In some embodiments, the lining 130 may be omitted. In some embodiments, the body 102 may include one or more additional layers, such as a foil layer, that may be disposed between the fibrous layer 120 and the lining 130.

In some embodiments, when the body 102 includes the lining 130 and/or other layer(s) disposed between the fibrous layer 120 and the lining 130, the body 102 may still be formed predominantly from one or more the fibrous materials as noted above. As used herein, the term predominantly means that at least 85%, more preferably at least 90%, and still more preferably at least 95% of the body 102 may be formed from one or more fibrous material.

In some embodiments, instead of the fibrous layer 120, the body 102 may include a plastic layer or a plastic tube with or without the lining 130. Thus, in some embodiments, the exterior surface 114 of the body 102 may be defined at least in part by the plastic tube. In some embodiments, the body 102 may include the lining 130 disposed over at least a portion or an entirety of the plastic tube. In some embodiments, the body 102 may not include the lining 130, and the interior surface 112 of the body 102 may be defined at least in part by the plastic tube.

In some embodiments, the plastic layer or tube may be formed from a plastic material including polypropylene (PP), polyethylene (PE) (e.g., high-density polyethylene (HDPE), low-density polyethylene (LDPE), etc.) polyethylene terephthalate (PET), and the like.

In some embodiments, the substance 160 may include a personal, oral, and/or home care product or composition. In some embodiments, the substance 160 may include a cleaning composition, such as a personal, oral, and/or home cleaning composition. In some embodiments, the substance 160 may include a toothpaste. Some additional non-limiting examples of forms of the substance 160 may include a paste, a gel, cream, a lotion, a spray, a liquid soap, etc. In some embodiments, the substance 160 may include a gel. In some embodiments, the substance 160 may include a paste. In some embodiments, the substance 160 may include a toothpaste gel or a toothpaste paste.

In some embodiments, the substance 160 may have a viscosity ranging from about 50,000 cPs to about 420,000 cPs—including all values and sub-ranges thereof, as determined by the testing method as described in Amit Ahuja, Giannina Luisi, Andrei Potanin, Rheological measurements for prediction of pumping and squeezing pressures of toothpaste, Journal of Non-Newtonian Fluid Mechanics 258 (2018) 1-9.

Depending on the substance 160, in some embodiments, the substance 160 may contain one or more surfactants, polymers, and/or oxidative chemical reagents. For example, some oral care products, such as toothpaste, may be generally hydrophilic and may include a mixture of water, glycerol, and sorbitol ingredients with backbone polymer(s) and surfactant(s). Physical and/or chemical interactions may occur between the substance 160 and packaging materials. The ingredients of the substance 160 may adsorb and/or absorb to the interior surface 112 of the body 102. In some instances, the ingredients of the substance 160 may even penetrate through the interior surface 112 of the body 102 and further interact with packaging material, such as the fibrous material forming the fibrous layer 120. These interactions may damage the packaging article 100 and/or affect the composition and/or stability of the substance 160.

To reduce and/or prevent the interaction between the substance 160 and the packaging materials, in some embodiments, a coating 180 may be disposed between the substance 160 and the interior surface 112 of the body 102. In some embodiments, the coating 180 may include a liquid coating. In some embodiments, the coating 180 may be substantially free of, or free of, a solid phase component. In some embodiments, after applied, the coating 180 may maintain a liquid state at a temperature greater than or about 10° C. In some embodiments, the coating 180 may maintain a liquid state for at least 30 days after being applied onto a surface, such as the interior surface 112 of the packaging article 100.

In some embodiments, the coating 180 may be disposed over substantially an entirety of the interior surface 112 of the body 102. In some embodiments, the coating 180 may be disposed over one or more portions of the interior surface 112 of the body 102. The coating 180 may include an interior surface 182 facing the interior cavity 108 of the packaging article 100. The coating 180 may further include an exterior surface 184 opposite the interior surface 182 and facing the interior surface 112 of the packaging article 100. The coating 180 may be in direct contact with the interior surface 112 of packaging article 100, and the coating 180 may also be in direct contact with the substance 160.

In some embodiments, the coating 180 may include an oil. The oil may be water immiscible or hydrophobic and may be in a liquid state at a temperature greater than or about 10° C. In some embodiments, the oil may be present in the coating in an amount ranging from 70 wt. % to about 99 wt. %—including all values and sub-ranges thereof. In other words, the oil may be the major component of the coating 180 in some embodiments. In some embodiments, the oil may be present in the coating in an amount ranging from about 70 wt. % to about 99 wt. %, from about 70 wt. % to about 95 wt. %, from about 70 wt. % to about 90 wt. %, from about 70 wt. % to about 85 wt. %, from about 70 wt. % to about 80 wt. %, from about 70 wt. % to about 75 wt. %, from about 75 wt. % to about 99 wt. %, from about 75 wt. % to about 95 wt. %, from about 75 wt. % to about 90 wt. %, from about 75 wt. % to about 85 wt. %, from about 75 wt. % to about 80 wt. %, from about 80 wt. % to about 99 wt. %, from about 80 wt. % to about 95 wt. %, from about 80 wt. % to about 90 wt. %, from about 80 wt. % to about 85 wt. %, from about 85 wt. % to about 99 wt. %, from about 85 wt. % to about 95 wt. %, from about 85 wt. % to about 90 wt. %, from about 90 wt. % to about 99 wt. %, from about 90 wt. % to about 95 wt. %, or from about 95 wt. % to about 99 wt. %.

In some embodiments, the oil may include a natural oil. In some embodiments, the oil may include an edible oil. The edible oil may include one or more of flaxseed oil, hemp seed oil, chia seed oil, and the like. In some embodiments, the oil may include one or more long-chain (e.g., C10 to C22) component, which may generally be hydrophobic. It has been discovered that for oils that lack such long-chain component, such as oils that have relatively shorter-chain components (e.g., C8 or less), a proper coating may not be formed over the interior surface 112 of the body and/or between the substance 160 and the interior surface 112 of the body 102.

As discussed above, in some embodiments, the substance 160 may be hydrophilic. Thus, the interaction between the substance 160 and the coating 180 may be limited due to the hydrophobicity of the oil of the coating 180, in particular, the hydrophobicity of the one or more long-chain components of the oil. Thus, the coating 180 can act as a divider between the substance 160 and the interior surface 112 of the body 102 of the packaging article 100 and block or prevent the substance 160 from interacting with the packaging materials.

In addition to serving as a divider, the oil may further provide antioxidant benefits. As discussion above, oxygen residues may exist in almost all products due to its presence in water and other ingredients for formulating the products. In some embodiments, the oil may include antioxidant components which may protect the substance 160 from oxidation. For example, the oil (e.g., flaxseed oil, hemp seed oil, chia seed oil, etc.) may include antioxidant components, such as omega-3 structures, isolated diene structures, and the like.

In some embodiments, the coating 180 may further include one or more surfactants. In some embodiments, the one or more surfactants and/or the amount thereof may be selected to facilitate adhesion of the coating 180 to the interior surface 112 of the packaging article 100, while also limiting and/or preventing the interaction between the coating 180 and the substance 160.

In some embodiments, the one or more surfactants may include a long-chain (e.g., C10 to C20) component and a polar or hydrophilic component, such as a polar or hydrophilic head. The long-chain (e.g., C10 to C20) component may interact with the oil of the coating 180, and the polar or hydrophilic component may reduce the surface tension of the coating 180, thereby facilitating the adhesion of the oil-containing coating 180 to the interior surface 112 of the packaging article 100.

The one or more surfactants can be any anionic, nonionic, amphoteric or zwitterionic surfactants, or combinations thereof. In some embodiments, the one or more surfactants may include betaine type surfactants, such as (C10-C20) alkyl betaines (e.g., coco betaine), (C10-C20)alkylamido (C1-C6)alkylbetaines (e.g., cocamidopropyl betaine), or the like. In some embodiments, the one or more surfactants may include glucoside surfactants (e.g., coo glucoside), glutamate surfactants (e.g., coco glutamate), or any other suitable surfactants. In some embodiments, the surfactant may include natural or plant-derived surfactants, such as coco betaine, coco glucoside, coco glutamate, or the like.

The one or more surfactants may be present in the coating 180 in an amount ranging from about 1 wt. % to about 30 wt. %—including all values and sub-ranges thereof. In some embodiments, the one or more surfactants may be present in the coating 180 in an amount ranging from about 1 wt. % to about 30 wt. %, from about 1 wt. % to about 25 wt. %, from about 1 wt. % to about 20 wt. %, from about 1 wt. % to about 15 wt. %, from about 1 wt. % to about 10 wt. %, from about 1 wt. % to about 5 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 30 wt. %, from about 15 wt. % to about 25 wt. %, from about 15 wt. % to about 20 wt. %, from about 20 wt. % to about 30 wt. %, from about 20 wt. % to about 25 wt. %, or from about 25 wt. % to about 30 wt. %.

In some embodiments, the one or more surfactants may be present in the coating 180 in an amount less than or about 30 wt. % so as to limit the interaction between the coating 180 and the substance 160 and/or prevent diffusion of the substance 160 into the coating 180 or vice versa. In some embodiments, the one or more surfactants may be present in the coating 180 in an amount less than or about 30 wt. %, less than or about 25 wt. %, less than or about 20 wt. %, less than or about 15 wt. %, less than or about 10 wt. %, less than or about 5 wt. %.

In some embodiments, a weight ratio of the oil to the surfactant may range from about 20:1 to about 5:1—including all values and sub-ranges thereof. In some embodiments, the weight ratio of the oil to the surfactant may range from about 20:1 to about 5:1, from about 16:1 to about 5:1, from about 12:1 to about 5:1, from about 8:1 to about 5:1, about 20:1 to about 8:1, from about 16:1 to about 8:1, from about 12:1 to about 8:1, about 20:1 to about 12:1, from about 16:1 to about 12:1, or about 20:1 to about 16:1.

Figure 3:
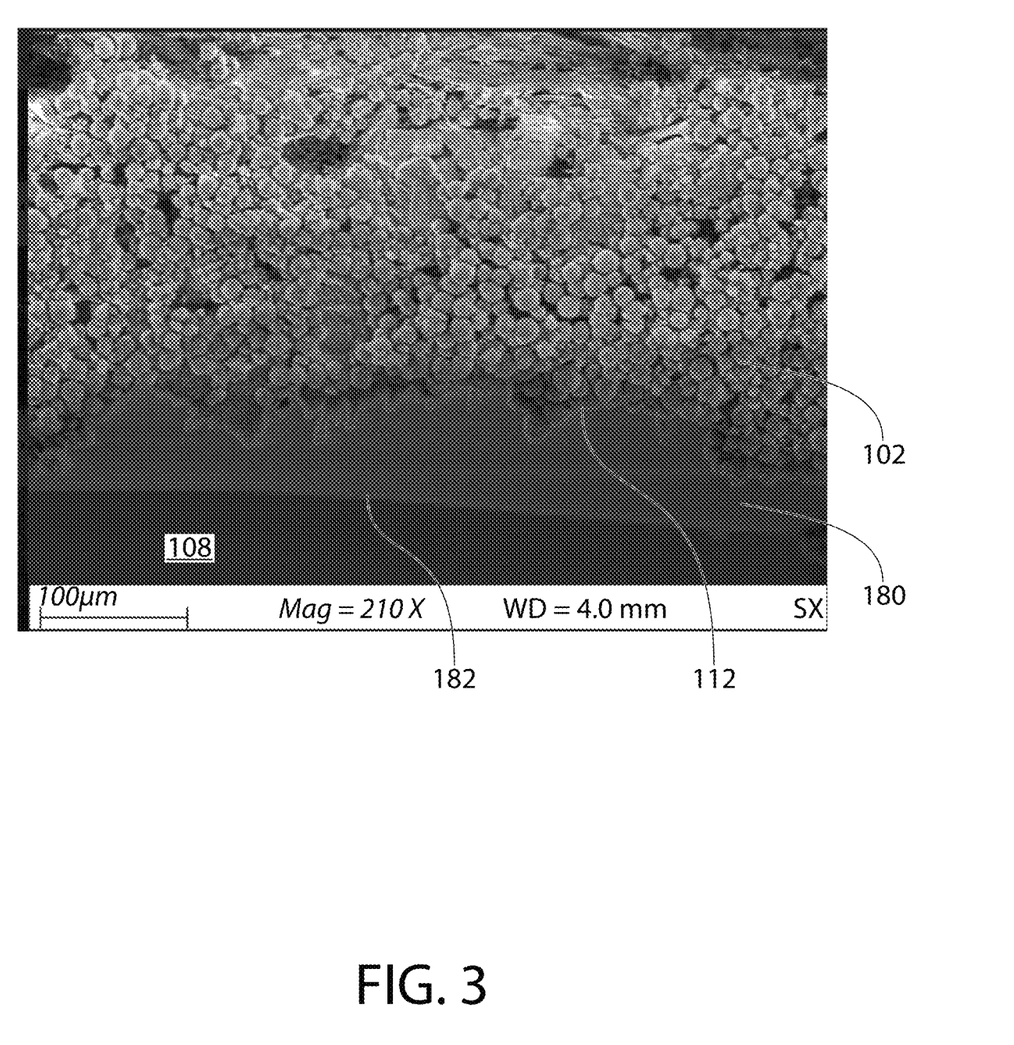
FIG. 3 shows a cryo-scanning electron microscope (Cryo-SEM) image of a cross section of a body of a packaging article with a coating according to some embodiments.

As discussed above, the combination of the oil and the surfactant of the coating 180 may allow the coating 180 to adhere to the interior surface 112 of the packaging article to serve as a divider between the substance and the packaging materials. FIG. 3 shows a cryo-scanning electron microscope (Cryo-SEM) image of the cross section of a body 102 of a packaging article with a coating 180 as described herein. Specifically, a piece of the body 102 of the packaging article with the coating 180 applied thereon was vertically mounted on a Cryo-SEM holder and plunged into liquid nitrogen. After cryo-fracture, the sample was transferred to the cryo-stage inside the SEM chamber and imaged at −140° C. As shown, the coating 180 may form a continuous layer covering the interior surface 112 of the body 102 of the packaging article. Such continuous layer may serve as a divider between the packaging materials of the packaging article and the substance to be filled into the interior cavity 108 of the packaging article, limiting or preventing the interaction between the substance and the packaging materials of the packaging article, thereby preserving the integrity of the packaging article and the stability of the substance.

Figure 4A:
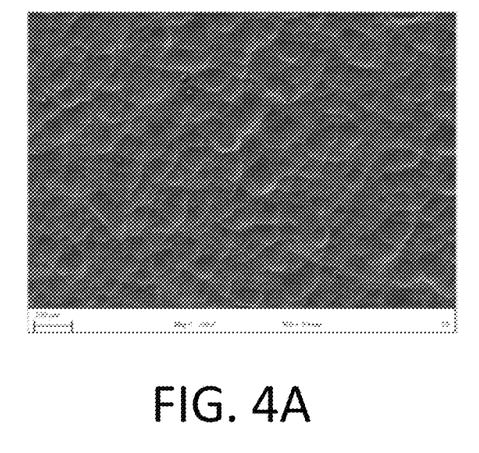
FIGS. 4A, 4B, and 4C show Cryo-SEM images of the interior surface of a packaging article without a coating at various magnifications.
Figure 4B:
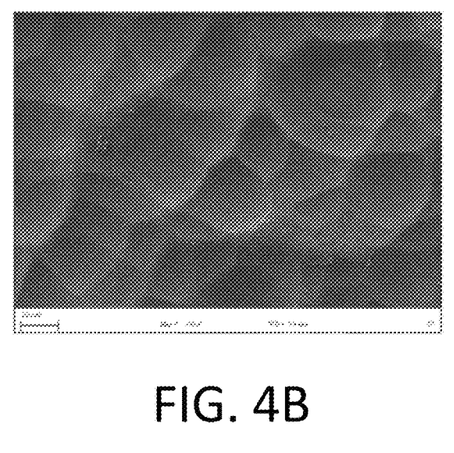
Figure 4C:
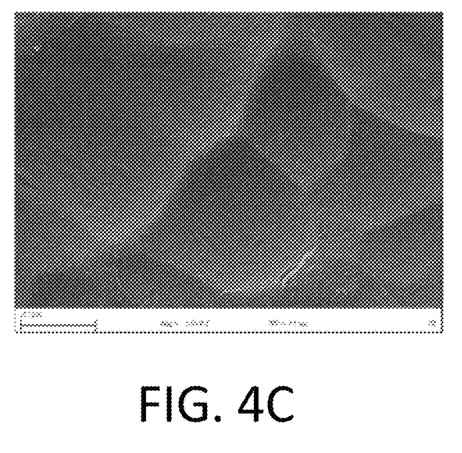
Figure 4D:
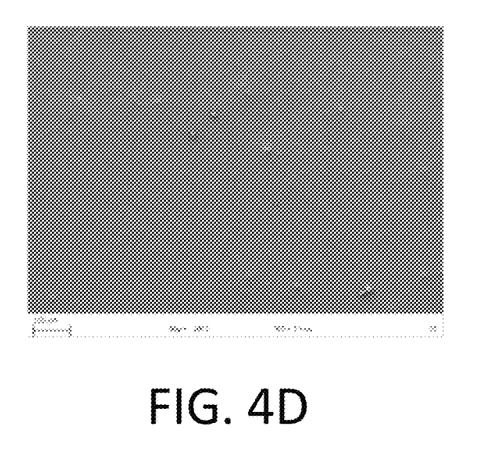
FIGS. 4D, 4E, and 4F show Cryo-SEM images of the interior surface of a packaging article with a coating at various magnifications according to some embodiments.
Figure 4E:
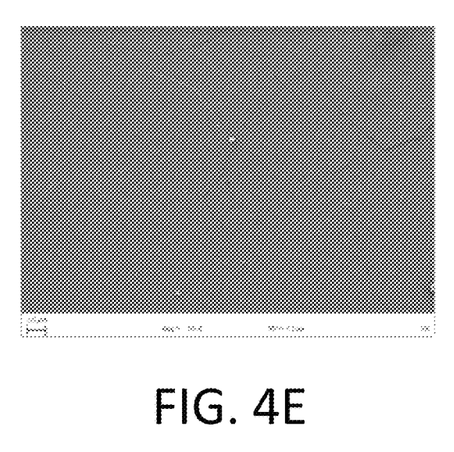
Figure 4F:
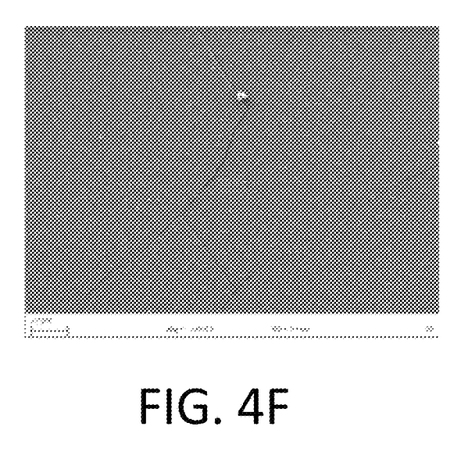

As also shown in FIG. 3, the interior surface 182 of the coating 180 may be significantly smoother than the interior surface 112 of the packaging article. With further reference to FIGS. 4A, 4B, and 4C, which show the Cryo-SEM images of the interior surface of the packaging article without the coating at ×100 magnification, ×500 magnification, and ×1000 magnification, respectively, the interior surface of the packaging article exhibits rough "mountain-valley" patterns. In contrast, with reference to FIGS. 4D, 4E, and 4F, which show the Cryo-SEM images of the interior surface of the packaging article with the coating at ×100 magnification, ×500 magnification, and ×1000 magnification, respectively, the interior surface of the coating is substantially smooth, showing the morphology of a frozen liquid. Some cracks were shown in the SEM images of FIGS. 4D-4F, which were indicative of the liquid state of the coating prior to being subject to liquid nitrogen for taking the Cryo-SEM images.

As shown in FIG. 3 and FIGS. 4A-4F, the coating may smooth out the rough interior surface of the packaging article and form a substantially smooth and complete layer covering the interior surface of the packaging article. Without intending to be bound by theory, the reduced roughness as achieved by the coating may reduce the interaction between the substance and the coating. For example, the smooth interior surface of the coating may reduce or prevent adhesion of the substance to the interior surface of the coating, which may facilitate dispensing of the substance out of the packaging article, thereby reducing waste of the substance.

Further, because the coating may be in a liquid state, the coating may serve as a lubricant between the interior surface of the packaging article and the substance. Without intending to be bound by theory, the combination of the surfactant and the oil in the coating may create greater adhesion between the coating and the interior surface of the packaging article than the cohesive force within the coating. The combination of the surfactant and the oil in the coating may further create greater adhesion between the coating and the substance than the cohesive force within the coating. In some embodiments, the adhesion between the coating and the substance may be less than the adhesion between the coating and the interior surface of the packaging article. Thus, when the substance is being dispensed, the coating in the liquid state may function as a lubricant between the interior surface of the packaging article and the substance to allow substantially all of the substance to be dispensed from the packaging article.

As discussed above, in some embodiments, the adhesion force between the coating and the substance may be greater than the cohesive force within the coating. Thus, in some embodiments, when the substance is dispensed out of the packaging article, some coating material (e.g., the oil and/or the surfactant) may be dispersed out of the packaging article along with the substance. Depending on the use of the substance, in some embodiments, the oil and/or the surfactants may be selected to be compatible with the intended use of the substance. For example, in some embodiments, the oil may be or include an edible oil, and the surfactant may be or include a natural surfactant as discussed herein.

To function as a lubricant, in some embodiments, the oil and/or the surfactant may be selected such that the coating may have a viscosity ranging from about 2,000 cPs to about 15,000 cPs—including all values and sub-ranges thereof, as determined by the testing method as described in Amit Ahuja, Giannina Luisi, Andrei Potanin, Rheological measurements for prediction of pumping and squeezing pressures of toothpaste, Journal of Non-Newtonian Fluid Mechanics 258 (2018) 1-9.

In some embodiments, the thickness of the coating may range from about 10 µm to about 300 µm—including all values and sub-ranges thereof. The thickness of the coating may allow the coating to effectively serve as a divider between the interior surface of the packaging article and the substance, thereby limiting or preventing the interaction between the packaging materials and the substance. The thickness of the coating may also allow the coating to effectively function as a lubricant to facilitate the dispensing of the substance out of the packaging article. Depending on the oil and/or the surfactant, the coating thickness may be selected such that a uniform coating may be formed on the interior surface of the packaging article to serve as a divider and/or a lubricant without excess dripping or flowing downward due to gravity. For example, in some embodiments, the thickness of the coating may range, e.g., from about 10 µm to about 300 µm, from about 10 µm to about 250 µm, from about 10 µm to about 200 µm, from about 10 µm to about 150 µm, from about 10 µm to about 100 µm, from about 10 µm to about 50 µm, from about 50 µm to about 300 µm, from about 50 µm to about 250 µm, from about 50 µm to about 200 µm, from about 50 µm to about 150 µm, from about 50 µm to about 100 µm, from about 100 µm to about 300 µm, from about 100 µm to about 250 µm, from about 100 µm to about 200 µm, from about 100 µm to about 150 µm, from about 150 µm to about 300 µm, from about 150 µm to about 250 µm, from about 150 µm to about 200 µm, from about 200 µm to about 300 µm, from about 200 µm to about 250 µm, or from about 250 µm to about 300 µm.

In some embodiments, the coating may include the oil and the surfactants and may not include other added ingredients. In some embodiments, no additional ingredients, other than the oil and the surfactant, may be present in the coating. For example, in some embodiments, the coating may be substantially free of a liquid carrier, such as water and/or a solvent. In some embodiments, the coating may be substantially free of water or free of water. For instance, the coating may include about 5 wt. % or less, about 4 wt. % or less, about 3 wt. % or less, about 2 wt. % or less, about 1 wt. % or less, about 0.5 wt. % or less, or about 0.1 wt. % or less of water, based on the total weight of the coating. In some embodiments, the coating may include about 0 wt. % of water. In some embodiments, the combination of the oil and the surfactant may be present in the coating in an amount of about 95 wt. % or more, about 96 wt. % or more, about 97 wt. % or more, about 98 wt. % or more, about 99 wt. % or more, about 99.5 wt. % or more, or about 99.9 wt. % or more. In some embodiments, the combination of the oil and the surfactant may be present in the coating in an amount of about 100 wt. %. In some embodiments, additional ingredients may be added to or present in the coating as long as such ingredients do not interfere with the coating's ability to serve as a divider and/or lubricant between the substance and the packaging material.

The coating may be applied onto the interior surface of the packaging article using any suitable methods. In some embodiments, a coating composition may be prepared by mixing one or more oils, one or more surfactants, and/or additional ingredients, if any, for forming the coating described above. The various ingredients may be present in the coating composition in amounts as discussed above with respect to each ingredient in the coating. The coating composition may then be applied to the interior surface of the packaging article via spraying, brushing, roll coating, immersion coating, dip coating, or any suitable coating techniques.

Implementation of the present disclosure is provided by way of the following examples. The examples serve to illustrate the technology without being limiting in nature.

EXAMPLES

Example 1

A non-limiting exemplary coating composition was prepared by mixing 10 mL of coco betaine surfactant (sold by the company Croda Inc.) with 90 mL flaxseed oil (sold by the company Shape Food Inc.) in a 250 ml beaker using a magnetic stir bar.

Example 2

Figure 5A:
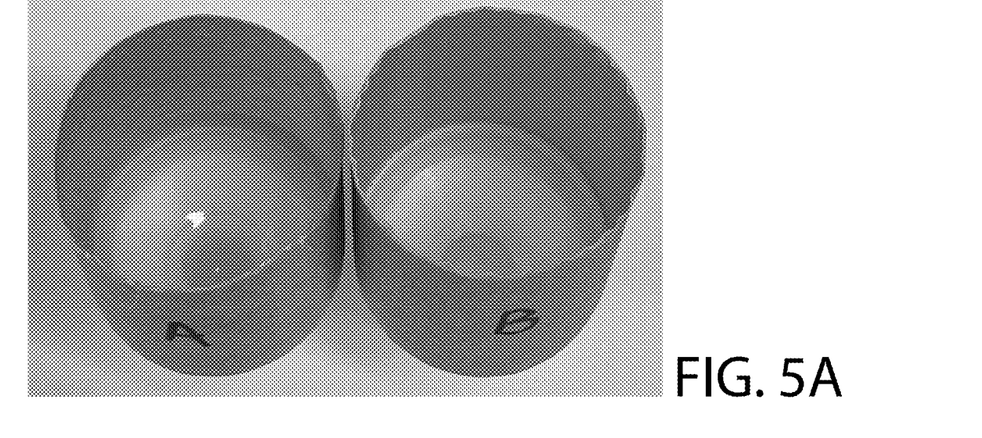
FIG. 5A shows a paper toothpaste tube with a coating and an uncoated paper toothpaste tube, both of which were cut into half for better illustration.

A paper-based toothpaste tube (sold by the company Stora Enso Oyj) was coated with the coating composition of Example 1. The paper-based toothpaste tube is constructed with a paper tube that has a PE lining and a foil layer between the paper tube and the PE lining. Specifically, the coating composition was poured on the interior surface of the uncoated toothpaste tube, and excess amount of the coating composition was poured out of tube to form a coating on the interior surface of the paper-based toothpaste tube. An uncoated paper-based toothpaste tube of the same type was used as a control. FIG. 5A shows the coated toothpaste tube (Tube A) and the uncoated toothpaste tube (Tube B). Both the coated and the uncoated toothpaste tubes were cut into half for better illustration. As can be seen in FIG. 5A, an oily coating layer was adsorbed onto the interior surface of the toothpaste tube (Tube A) and form a continuous coating on the interior surface of the toothpaste tube (Tube A).

Figure 5B:
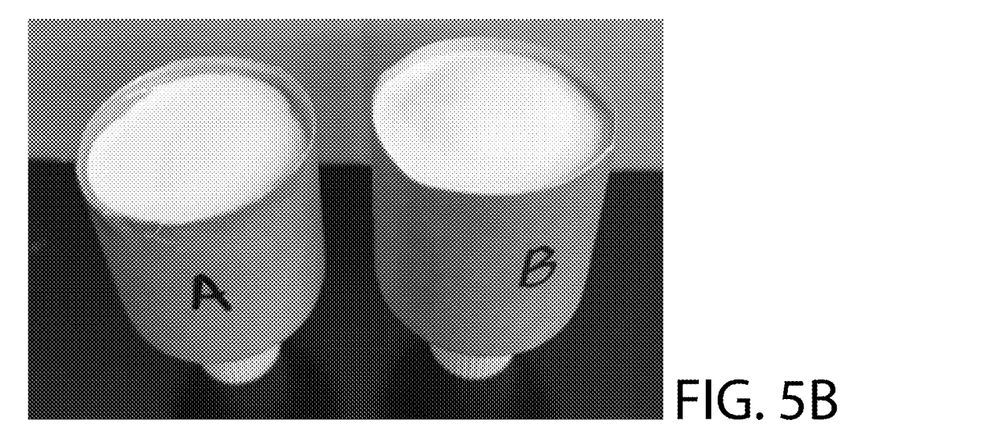
FIG. 5B shows the coated paper toothpaste tube and the uncoated paper toothpaste tube of FIG. 5A filled with a toothpaste in a paste form.

The coated toothpaste tube (Tube A) and the uncoated toothpaste tube (Tube B) were then each filled with a commercial toothpaste in a paste form, as shown in FIG. 5B. As can be seen from FIG. 5B, the coating in the coated toothpaste tube (Tube A) form a physical separation or divider between the toothpaste and the toothpaste tube (Tube A). The toothpaste was then set inside the tubes for six hours. Within the six hours, no significant change in the toothpaste was observed, and the coating was maintained.

Figure 5C:
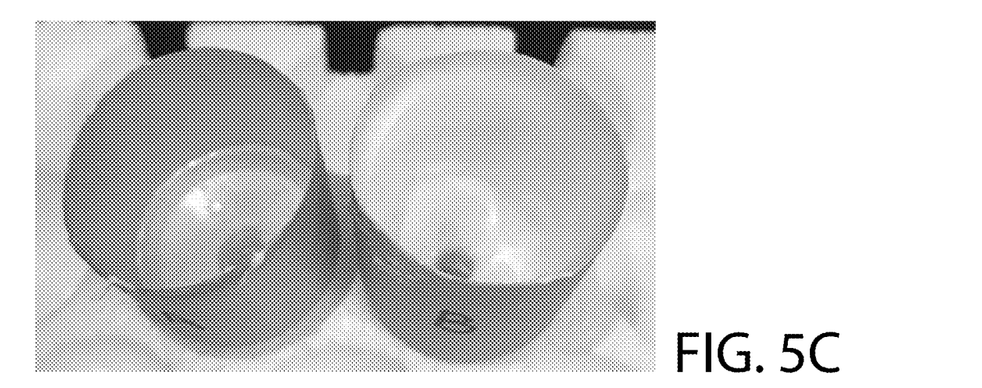
FIG. 5C shows the coated paper toothpaste tube and the uncoated paper toothpaste tube of FIG. 5B after dispensing the toothpaste.

After six hours, the toothpaste tubes were placed upside down, and the toothpaste was removed from the toothpaste tubes by squeezing the tubes, resulting the toothpaste being dispensed from the dispensing end of the tubes. FIG. 5C shows the toothpaste tubes after dispensing the toothpaste. As can be seen in FIG. 5C, a significant amount of toothpaste was left on the interior surface of the uncoated toothpaste tube (Tube B). Surprisingly, substantially no toothpaste was left on the interior surface of the coated toothpaste tube (Tube A). This indicates that a coating in accordance with the present disclosure can prevent interaction between the toothpaste and the toothpaste tube, and also facilitate complete dispensing of the toothpaste out of the toothpaste tube.

Example 3

A plastic tube (45 mL polypropylene centrifuge tube sold by VWR International) was coated with the coating composition of Example 1. Another plastic tube of the same kind without a coating was used as a control. The uncoated plastic tube and the coated plastic tube were then each filled with a same amount of a commercial toothpaste in a gel form. The amount of toothpaste only filled a portion of each plastic tube. Both plastic tubes were then flip several times with the toothpaste contained therein.

Figure 6A:
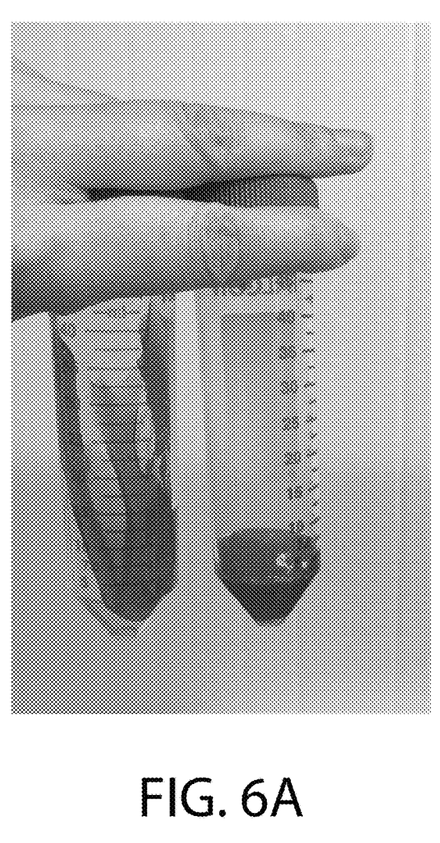
FIGS. 6A and 6B show an uncoated plastic tube and a coated plastic tube with toothpaste in a gel form partially filling the tubes in flipped orientations.
Figure 6B:
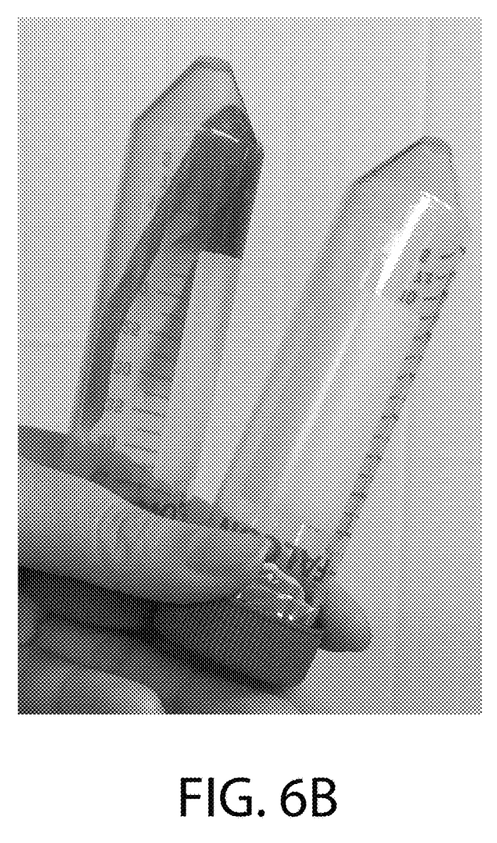

FIGS. 6A and 6B show the two orientations of the uncoated plastic tube and the coated plastic tube between which the plastic tubes were flipped. In both FIGS. 6A and 6B, the plastic tube on the left was the uncoated plastic tube, and the plastic tube on the right was the coated plastic tube. As can be seen in FIGS. 6A and 6B, the toothpaste adhered onto the interior surface of the uncoated plastic tube. Surprisingly, the toothpaste inside the coated plastic tube was able to slide between one end of the coated plastic tube, as shown in FIG. 6A, and the other end of the coated plastic tube, as shown in FIG. 6B. No toothpaste adhered to the interior surface of the coated plastic tube. This indicates that a coating in accordance with the present disclosure can effectively separate toothpaste from a plastic container, prevent adhesion of the toothpaste onto the interior surface of the container, and serve effectively as a lubricant to facilitate movement of the toothpaste inside the container, thereby facilitating complete dispensing of all toothpaste out of the container.

What is claimed is:

1. A coated packaging article for an oral, personal, or home care composition, comprising:
    a packaging article comprising a body having an interior surface; and
    a coating disposed over at least one portion of the interior surface of the body, the coating comprising an edible oil and a surfactant;
    wherein the coating is in a liquid state on the interior surface inside the packaging article;
    wherein the surfactant comprises at least one of a betaine type surfactant, a glucoside surfactant, or a glutamate surfactant;
    wherein the edible oil comprises at least one of flaxseed oil, hemp seed oil, or chia seed oil; and
    wherein a weight ratio of the edible oil to the surfactant ranges from about 20:1 to about 5:1.

2. The coated packaging article according to claim 1, wherein the surfactant comprises a natural surfactant.

3. The coated packaging article according to claim 1, wherein the surfactant comprises a C10-C20 long-chain component.

4. The coated packaging article according to claim 1, wherein the edible oil comprises a C10-C22 long-chain component.

5. The coated packaging article according to claim 1, wherein the edible oil is present in the coating in an amount ranging from 70 wt. % to about 99 wt. %.

6. The coated packaging article according to claim 1, wherein a thickness of the coating ranges from about 10 μm to about 300 μm.

7. The coated packaging article according to claim 1, wherein the coating is configured to maintain the liquid state on the interior surface inside the packaging article for at least 30 days.

8. The coated packaging article according to claim 1, wherein the coating is in direct contact with the at least one portion of the interior surface of the body.

9. The coated packaging article according to claim 1, wherein the coating forms a surface facing an interior of the packaging article, and wherein the surface formed by the coating is substantially smooth.

10. The coated packaging article according to claim 1, wherein the body comprises a fibrous material.

11. The coated packaging article according to claim 10, wherein the interior surface of the body is defined at least in part by the fibrous material.

12. The coated packaging article according to claim 10, wherein the body further comprises a lining disposed over the fibrous material, wherein the interior surface of the body is defined at least in part by the lining, and wherein the lining comprises at least one of polyethylene (PE), polyethylene terephthalate (PET), paperboard, cardboard, or fiberboard.

13. The coated packaging article according to claim 1, wherein the body comprises a plastic tube, and wherein the interior surface of the body is defined at least in part by the plastic tube.

14. The coated packaging article according to claim 13, wherein the plastic tube comprises at least one of polypropylene (PP), polyethylene (PE), or polyethylene terephthalate (PET).

15. A packaged substance, comprising:
    a toothpaste; and
    a coated packaging comprising:
        a packaging article comprising a body having an interior surface; and a coating disposed over at least one portion of the interior surface of the body, the coating comprising:
an edible oil comprising at least one of flaxseed oil, hemp seed oil, or chia seed oil; and
a surfactant comprising a C10-C20 long-chain component;
wherein the toothpaste is received in the packaging article;
the coating is in a liquid state on the interior surface inside the packaging article, the coating disposed between the interior surface of the body of the packaging article and the toothpaste.

16. A method of dispensing a packaged substance according to claim 15, the method comprising dispensing a portion of the substance out of the packaging article, wherein a portion of the coating is dispersed out of the packaging article along with the substance.

17. The coated packaging article according to claim 15, wherein the surfactant comprises at least one of a betaine type surfactant, a glucoside surfactant, or a glutamate surfactant.

18. The coated packaging article according to claim 15, wherein the edible oil comprises at least one of flaxseed oil, hemp seed oil, or chia seed oil.

19. The coated packaging article according to claim 15, wherein a weight ratio of the edible oil to the surfactant ranges from about 20:1 to about 5:1.

* * * * *